(12) United States Patent
Davis et al.

(10) Patent No.: US 9,810,097 B2
(45) Date of Patent: Nov. 7, 2017

(54) CORRUGATED MID-TURBINE FRAME THERMAL RADIATION SHIELD

(71) Applicant: United Technologies Corporation, Hartford, CT (US)

(72) Inventors: Alisha M. Davis, West Granby, CT (US); Christina S. Liebel, Wethersfield, CT (US); Conway Chuong, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 268 days.

(21) Appl. No.: 14/853,293

(22) Filed: Sep. 14, 2015

(65) Prior Publication Data

US 2016/0108758 A1    Apr. 21, 2016

Related U.S. Application Data

(63) Continuation of application No. 13/543,277, filed on Jul. 6, 2012, now Pat. No. 9,151,226.

(51) Int. Cl.
| | |
|---|---|
| *F01D 25/28* | (2006.01) |
| *F01D 25/14* | (2006.01) |
| *F01D 25/24* | (2006.01) |
| *F01D 25/08* | (2006.01) |
| *F01D 9/06* | (2006.01) |

(Continued)

(52) U.S. Cl.
CPC ............. *F01D 25/28* (2013.01); *F01D 9/065* (2013.01); *F01D 25/08* (2013.01); *F01D 25/145* (2013.01); *F01D 25/24* (2013.01); *F02K 3/04* (2013.01); *F01D 25/16* (2013.01); *F02C 7/20* (2013.01);

(Continued)

(58) Field of Classification Search
CPC .......... F01D 9/065; F01D 25/08; F01D 25/16; F01D 25/24; F01D 25/28; F01D 25/145; F02K 3/04; F02C 7/20; F05D 2260/231; F28F 2265/10
See application file for complete search history.

(56) References Cited

U.S. PATENT DOCUMENTS

| | | |
|---|---|---|
| 4,202,552 A | 5/1980 | Hirs |
| 4,369,016 A | 1/1983 | Dennison |

(Continued)

FOREIGN PATENT DOCUMENTS

| | | |
|---|---|---|
| EP | 1262636 A2 | 12/2002 |
| GB | 1571779 | 7/1980 |
| JP | 2002364307 A | 12/2002 |

OTHER PUBLICATIONS

International Search Report and Written Opinion, dated Apr. 25, 2014, for PCT Application No. PCT/US2013/046780, 10 pages.

(Continued)

*Primary Examiner* — Igor Kershteyn
(74) *Attorney, Agent, or Firm* — Kinney & Lange, P.A.

(57) ABSTRACT

A corrugated shield comprises a mounting base and a corrugated ring section. The mounting base is disposed at an aft end of the ring section for securing the shield ring section within a generally annular cavity. The generally annular cavity is defined at least in part by a hot fluid flow path boundary wall, and a radially adjacent and spaced apart cold fluid flow path boundary wall. The corrugated ring section is configured to substantially block a line of sight between the hot fluid flow path boundary wall and the cold fluid flow path boundary wall.

20 Claims, 7 Drawing Sheets

(51) Int. Cl.
 *F02K 3/04* (2006.01)
 *F02C 7/20* (2006.01)
 *F01D 25/16* (2006.01)

(52) U.S. Cl.
 CPC .... *F05D 2260/231* (2013.01); *F28F 2265/10* (2013.01); *Y02T 50/675* (2013.01)

(56) References Cited

U.S. PATENT DOCUMENTS

| | | | |
|---|---|---|---|
| 4,920,742 A | 5/1990 | Nash et al. | |
| 5,174,714 A | 12/1992 | Plemmons et al. | |
| 5,273,397 A | 12/1993 | Czachor et al. | |
| 5,291,733 A * | 3/1994 | Halila | F23R 3/60 |
| | | | 60/752 |
| 5,429,478 A | 7/1995 | Krizan et al. | |
| 5,634,767 A * | 6/1997 | Dawson | F01D 25/246 |
| | | | 415/134 |
| 6,050,079 A * | 4/2000 | Durgin | F02C 7/125 |
| | | | 415/115 |
| 6,511,284 B2 | 1/2003 | Darnell et al. | |
| 7,093,439 B2 | 8/2006 | Pacheco-Tougas et al. | |
| 7,229,249 B2 | 6/2007 | Durocher et al. | |
| 7,246,996 B2 | 7/2007 | Harris | |
| 7,779,637 B2 | 8/2010 | Heilos | |
| 7,946,807 B2 | 5/2011 | Philippot | |
| 9,206,742 B2 * | 12/2015 | Chuong | F01D 25/12 |
| 9,297,312 B2 * | 3/2016 | Chuong | F02C 7/20 |
| 9,541,006 B2 * | 1/2017 | Chuong | F02C 7/28 |
| 9,631,517 B2 * | 4/2017 | Liles | F01D 25/162 |
| 2003/0161718 A1 | 8/2003 | Nguyen et al. | |
| 2010/0132371 A1 | 6/2010 | Durocher et al. | |
| 2011/0081237 A1 | 4/2011 | Durocher et al. | |
| 2011/0189002 A1 | 8/2011 | Panaite et al. | |

OTHER PUBLICATIONS

Extended European Search Report, for European Patent Application No. 13845413.7, dated Jun. 30, 2016, 8 pages.

* cited by examiner

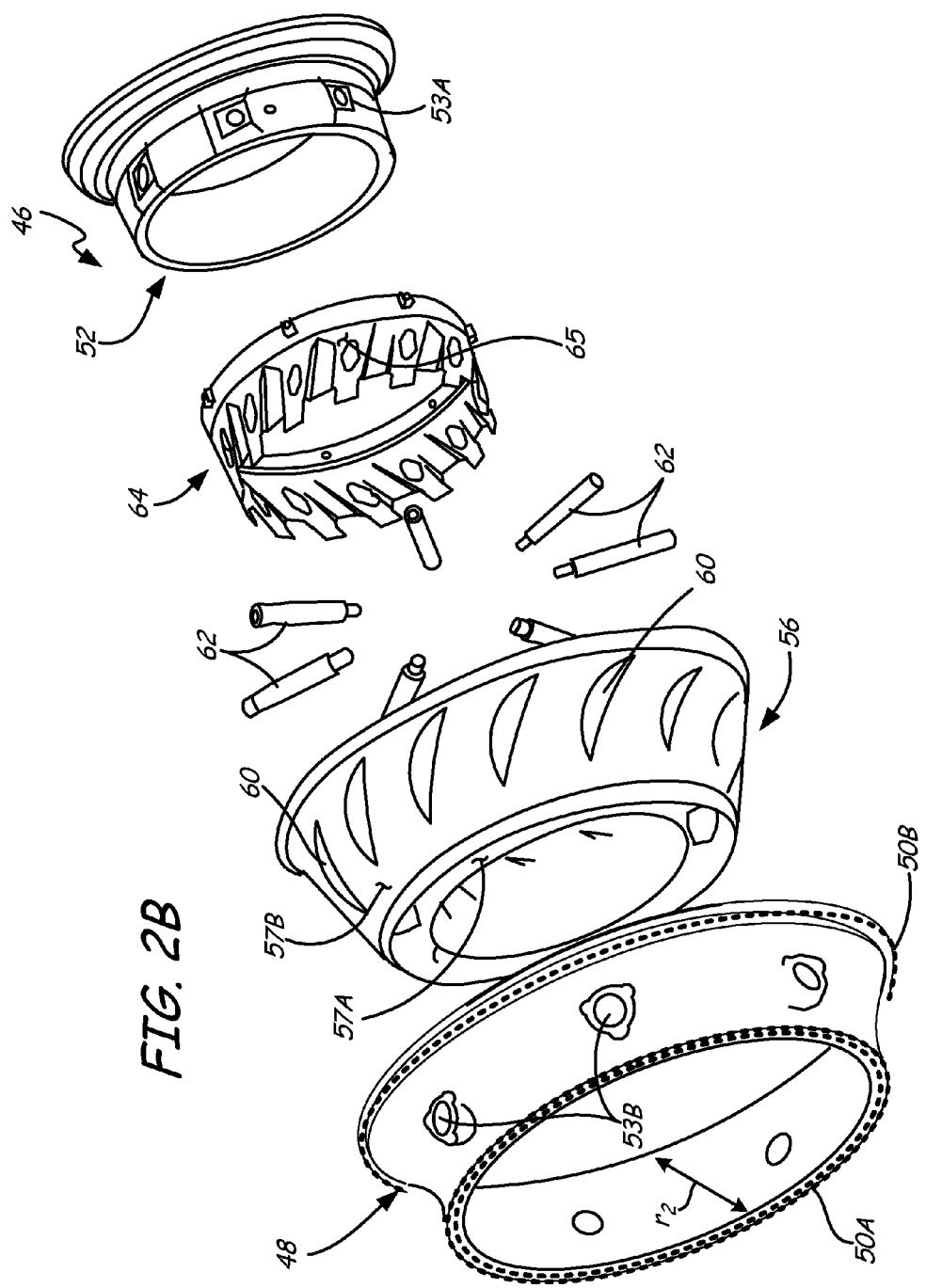

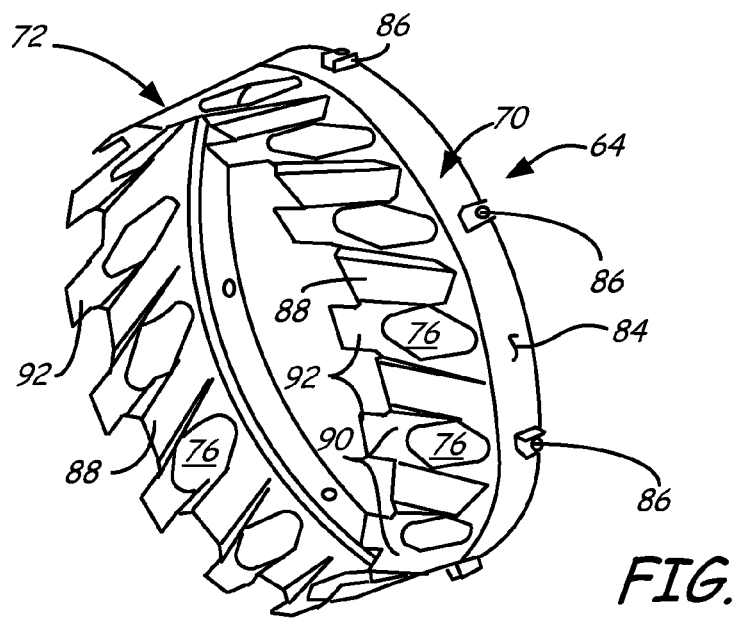
FIG. 3A
FIG. 3B
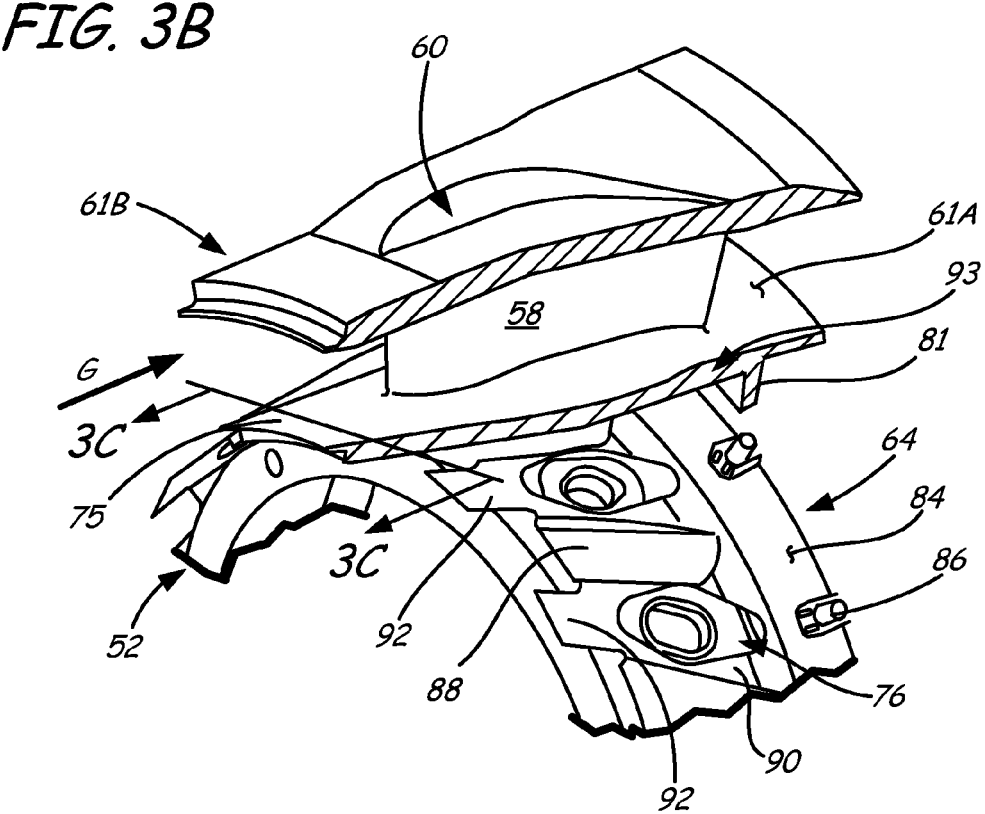

CORRUGATED MID-TURBINE FRAME THERMAL RADIATION SHIELD

CROSS-REFERENCE TO RELATED APPLICATION(S)

This application is a continuation of U.S. application Ser. No. 13/543,277 filed Jul. 6, 2012 for "CORRUGATED MID-TURBINE FRAME THERMAL RADIATION SHIELD" by Alisha M. Zimmermann, Christina A. Liebel (née Stenman), and Conway Chuong.

BACKGROUND

The described subject matter relates generally to gas turbine engines and more particularly, to arrangements for separating hot and cold flows in gas turbine engines.

Compact engines require closer packing of components, which in turn requires more crossing of hot and cold gas flows. Without adequate thermal protection, seals, and insulation between these flows, smaller engines suffer from a loss of efficiency. One system developed for certain engines is the mid-turbine frame (MTF), also known as the turbine center frame (TCF) or interturbine frame. This can be disposed between intermediate stages of the turbine section and can have numerous components serving a variety of functions, including as bearing support, engine backbone, combustion gas flow path, coolant flow path, among others.

Despite tight sealing of the various flows, efficiency gains expected from increased combustion temperatures are not always realized due in part to hot section components being disposed in close proximity to cold section components. As engines are made smaller, the clearances between components, including in the mid-turbine frame area also become tighter. Additional measures must therefore be taken to maintain flow separation and account for higher thermal gradients.

SUMMARY

A thermal radiation shield comprises a mounting base and a corrugated ring section. The mounting base is disposed at an aft end of the ring section for securing the shield ring section within a generally annular cavity. The generally annular cavity is defined at least in part by a hot fluid flow path boundary wall, and a radially adjacent and spaced apart cold fluid flow path boundary wall. The corrugated ring section is configured to substantially block a line of sight between the hot fluid flow path boundary wall and the cold fluid flow path boundary wall.

A gas turbine engine mid-turbine frame comprises a radially outer case, a radially inner case, a plurality of load spokes, a vane pack, and a corrugated shield. The radially outer case bounds an outer cold section outward of the outer case. The radially inner case bounds an inner cold section inward of the inner case. The radially outer and inner cases define an annular hot section therebetween. The plurality of load spokes extend radially through the hot section and secure the outer case with the inner case. The vane pack defines a sealed core flow gas path axially traversing an annular portion of the hot section. The corrugated thermal radiation shield is suspended within a generally annular hot section cavity defined outside the sealed core flow gas path. The corrugated thermal radiation shield includes a corrugated ring section.

BRIEF DESCRIPTION OF THE DRAWINGS

FIG. 2B shows an exploded view of certain components of the mid-turbine frame depicted in FIG. 2A.

FIG. 3A is a perspective view of an example embodiment of a corrugated thermal radiation shield.

FIG. 3B shows in perspective the example corrugated shield disposed between an inner case and a portion of a vane pack.

DETAILED DESCRIPTION

Figure 1:
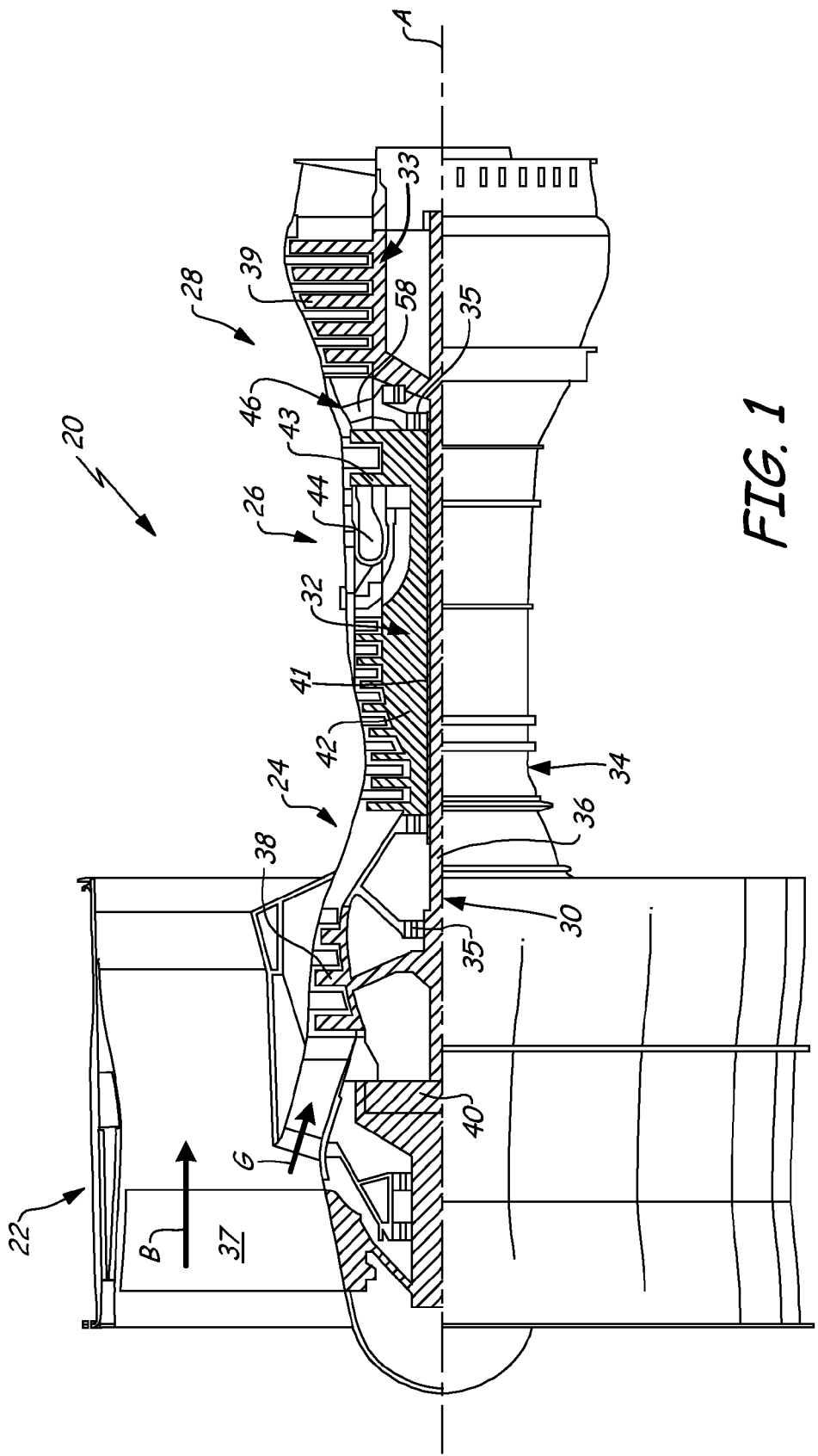
FIG. 1 is a schematic cross-sectional view of a turbofan gas turbine engine according to the present description.

FIG. 1 schematically illustrates an example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path G where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 34 via several bearing systems 35. It should be understood that various bearing systems 35 at various locations may alternatively or additionally be provided.

Low speed spool 30 generally includes inner shaft 36 that connects fan 37 and low pressure (or first) compressor section 38 to low pressure (or first) turbine section 39. Inner shaft 36 drives fan 37 through a speed change device, such as geared architecture 40, to drive fan 37 at a lower speed than low speed spool 30. High-speed spool 32 includes outer shaft 41 that interconnects high pressure (or second) compressor section 42 and high pressure (or second) turbine section 43. Inner shaft 36 and outer shaft 41 are concentric and rotate via bearing systems 35 about engine central longitudinal axis A.

Combustor 44 is arranged between high pressure compressor 42 and high pressure turbine 43. In one example, high pressure turbine 43 includes at least two stages to provide a double stage high pressure turbine 43. In another example, high pressure turbine 43 includes only a single stage. As used herein, a "high pressure" compressor or turbine experiences a higher pressure than a corresponding "low pressure" compressor or turbine.

The example low pressure turbine 39 has a pressure ratio that is greater than about 5. The pressure ratio of the example low pressure turbine 39 is measured prior to an inlet of low pressure turbine 39 as related to the pressure measured at the outlet of low pressure turbine 39 prior to an exhaust nozzle.

Mid-turbine frame 46 of engine static structure 34 is arranged generally between high pressure turbine 43 and low pressure turbine 46. Mid-turbine frame 46 further supports bearing systems 35 in turbine section 28 as well as setting airflow entering low pressure turbine 46.

The core airflow G is compressed by low pressure compressor 38 then by high pressure compressor 42 mixed with fuel and ignited in combustor 44 to produce high speed exhaust gases that are then expanded through high pressure turbine 43 and low pressure turbine 46. Mid-turbine frame 46 includes vanes 58, which are in the core airflow path and function as an inlet guide vane for low pressure turbine 39. Utilizing vane 58 of mid-turbine frame 46 as the inlet guide vane for low pressure turbine 39 decreases the length of low pressure turbine 39 without increasing the axial length of mid-turbine frame 46. Reducing or eliminating the number of vanes in low pressure turbine 39 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 40 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 38. It should be understood, however, that the above parameters are only exemplary of one embodiment of a gas turbine engine including a geared architecture and that the present disclosure is applicable to other gas turbine engines.

A significant amount of thrust is provided by bypass flow B due to the high bypass ratio. Fan section 22 of engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(T_{ram}° R)/518.7)^{0.5}]$. The "Low corrected fan tip speed", as disclosed herein according to one non-limiting embodiment, is less than about 1150 ft/second.

The example gas turbine engine includes fan 37 that comprises in one non-limiting embodiment less than about 26 fan blades. In another non-limiting embodiment, fan section 22 includes less than about 20 fan blades. Moreover, in one disclosed embodiment low pressure turbine 39 includes no more than about 6 turbine rotors schematically indicated at 33. In another non-limiting example embodiment low pressure turbine 39 includes about 3 turbine rotors. A ratio between number of fan blades 37 and the number of low pressure turbine rotors is between about 3.3 and about 8.6. The example low pressure turbine 39 provides the driving power to rotate fan section 22 and therefore the relationship between the number of turbine rotors at 33 in low pressure turbine 39 and number of blades in fan section 22 disclose an example gas turbine engine 20 with increased power transfer efficiency.

Figure 2A:
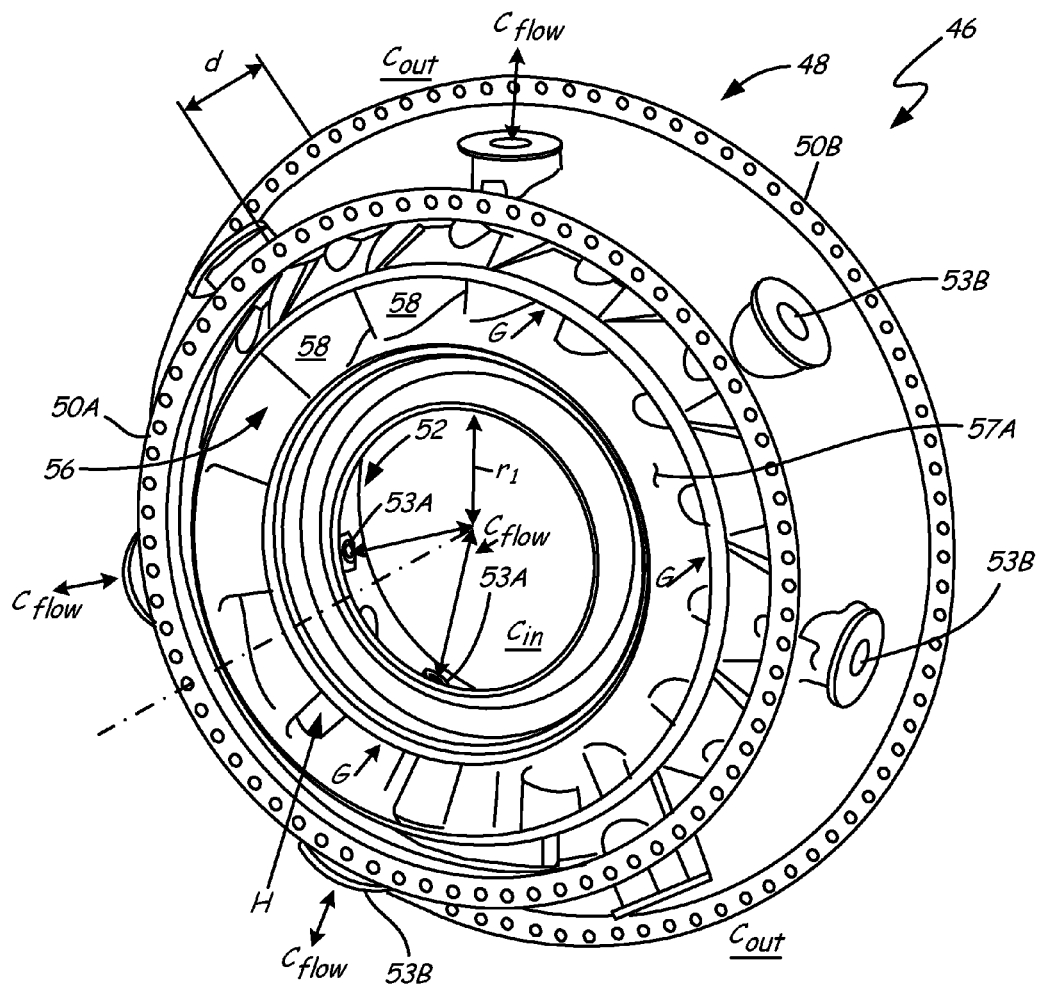
FIG. 2A shows a perspective view of an example embodiment of a mid-turbine frame for a gas turbine engine.

FIG. 2A shows MTF 46, and includes outer case 48, outer case flanges 50A, 50B, inner case 52, inner coolant port 53A, outer coolant port 53B, vane pack 56, inner vane pack wall 57A, outer vane pack wall 57B, and vanes 58.

An example embodiment of MTF 46 has outer case 48 with axially opposed outer case flanges 50A, 50B (separated by axial distance d) for mounting MTF 46 to adjacent engine component cases (e.g., cases of HPT 43, LPT 39). Axial distance d approximates the axial length of MTF 46, and can vary in part based on the available length of the engine core. Outer case 48 can also be radially secured to inner case 52 to define an engine support frame. In one non-limiting example, a plurality of radially extending and circumferentially distributed load spokes (not visible in FIG. 2A) structurally join outer case 48 with inner case 52.

In certain embodiments, outer case 48 defines an inner boundary of an outer cold section $C_{out}$, located in the region radially outward of outer case 48. Similarly, inner case 52 can define an inner cold section $C_{in}$, located radially inward of inner case 52. Hot section H includes the annular region radially disposed between $C_{out}$ and $C_{in}$ (outer case 48 and inner case 52), extending axially through MTF 46. Cold gas path $C_{flow}$ can radially communicate coolant (e.g., compressor bleed air) between outer cold section $C_{out}$ and inner cold section $C_{in}$, via respective inner coolant ports 53A and outer coolant ports 53B Inner cold section $C_{in}$ may be further delineated around inner case 52 by various shafts, bearings, and ducts which are retained by or within inner case 52. These and other arrangements have been omitted in favor of more clearly showing elements of MTF 46.

Sealed core flow gas flow path G can occupy an annular portion of hot section H to direct combustion gas products axially through MTF 46. Here path G is defined generally between respective radially inner and outer walls 57A, 57B and around vanes 58. Inner wall 57A of vane pack 56 can define an inner hot fluid flow path boundary wall for core flow gas path G and is spaced apart from inner case 52 serving as a cold fluid flow path boundary wall for inner cold section $C_{in}$. Similarly, outer wall 57B defines an outer hot fluid flow path boundary wall spaced apart from outer case 48 serving as a cold fluid flow path boundary wall for outer cold section $C_{out}$. As will be seen below, depending on the configuration of vane pack 56, there can be at least one of an inner or outer generally annular hot section cavity disposed in hot section H between a hot fluid flow path boundary walls (inner and/or outer vane pack walls 57A, 57B) and an adjacent cold fluid flow path boundary wall (inner case 52 and/or outer case 48).

In the example of FIG. 1, vane pack 56 operates as a first stage inlet stator for LPT 39. MTF 46 can be alternatively arranged between other pairs of adjacent turbine stages. Vane pack 56 is shown here as having vanes 58 integrally formed monolithic inner and outer walls 57A, 57B. In certain embodiments, vanes 58 may be removably secured to one or both walls. Inner and outer walls 57A, 57B may alternatively be segmented. In embodiments with one or both inner and outer walls 57A, 57B being segmented, the segments may be joined together such as by brazing, welding, or other semi-permanent metal joining processes. Circumferentially distributed seal elements may also be used to supplement or replace the semi-permanent joints and reduce leakage.

Despite being sealed and radially spaced apart from inner case 52, inner vane pack wall 57A emits substantial thermal radiation during engine operation. A corrugated thermal radiation shield, examples of which are described below, can be disposed in a generally annular inner hot section cavity between inner wall 57A and inner case 52 to reflect this radiation away from inner case 52. The corrugated thermal radiation shield can be adapted to account for the geometry of vane pack 56, including forward vane extension 75 (shown in FIG. 2C). It will be appreciated that an arrangement similar to that described below may readily be adapted for thermal radiation emitted from outer vane pack wall 57B through an outer annular hot section cavity toward outer case 48.

FIG. 2B is an exploded view of MTF 46, including outer case 48, outer case flanges 50A, 50B, inner case 52, vane pack 56, inner vane pack wall 57A, outer vane pack wall 57B, stator vanes 58, vane internal passages 60, spokes 62, corrugated shield 64, and reflective shield surface 65.

The components shown in the exploded view of MTF 46 generally fit axially together in the order shown in FIG. 2B, with the exception of the plurality of radially extending and circumferentially distributed load spokes 62, which secure outer case 48 with inner case 52. In certain embodiments, load spokes 62 are structural while also providing a radial flow path $C_{flow}$ between inner and outer cold sections $C_{in}$, $C_{out}$. For compactness and improved efficiency of engine 10, spokes 62 can be retained in some or all of passages 60 disposed radially through individual vanes 58. In this example, there are seven load spokes 62 extending through alternating ones of fourteen vanes 58 via respective vane internal passages 60. However, the number and arrangement of vanes 58 and spokes 62 will vary based on individual considerations, including but not limited to thermal and structural loads.

Smaller to mid-size engines utilizing various embodiments of a mid-turbine frame will often have limited clearance between hot and cold section components, which increases thermal conflict between hot and cold gas flows. Smaller engines have reduced axial dimension d and/or radial dimensions $r_1$ and $r_2$ around MTF 46, which reduces the spacing, and thus, the available clearance between hot vane pack 56 and respective cold outer and inner cases 48, 52. To fit in the smallest spaces, shield 64 can have a corrugated ring section with an outer circumferential surface 65 that generally conforms to, but is spaced apart from an irregularly shaped inner vane pack wall 57A. Corrugated shield 64 reflects a portion of emitted thermal radiation back toward vane pack 56 and away from inner case 52, while still fitting between tightly spaced components as described below.

Figure 2C:
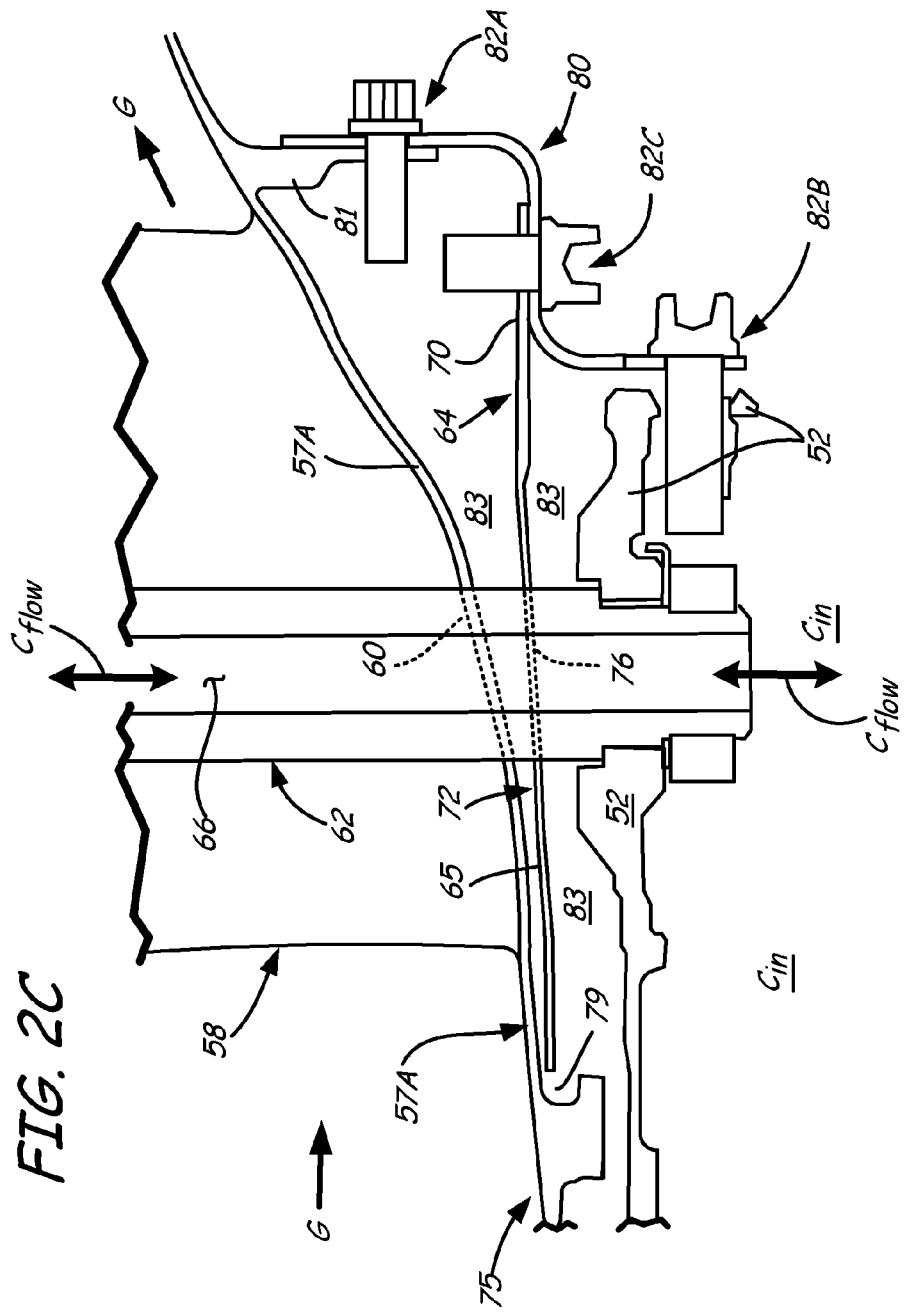
FIG. 2C is a partially cut away cross-sectional view of the mid-turbine frame of FIG. 2A.

FIG. 2C shows inner case 52, inner vane pack wall 57A, stator vane 58, vane internal passage 60, spoke 62, corrugated shield 64, shield reflective surface 65, spoke bore 66, shield mounting base 70, shield ring section 72, forward vane extension 75, shield aperture 76, forward vane rail pocket 79, LPT rotor shield 80, aft vane flange 81, aft seal mounts 82A, 82B, 82C, and inner annular hot section cavity 83.

FIG. 2C shows one illustrative example of a corrugated shield secured relative to an overall MTF convective sealing arrangement. One or more spokes 62 can include bore 66 defining radial cooling air flow path ($C_{flow}$) between inner and outer cold sections $C_{in}$, $C_{out}$. The forward end of inner case 52 can optionally be sealed to inner vane pack wall 57A proximate HPT 43 by any suitable means (not shown). Forward vane extension 75 can be formed integrally with inner vane pack wall 57A. At the aft (LPT) end of inner case 52, LPT rotor shield 80 includes first mount 82A securing an upper portion of rotor shield 80 to aft vane flange 81 extending radially inward from inner vane pack wall 57A. Second mount 82B joins a lower portion of LPT rotor shield 80 to an aft flange (not numbered) on inner case 52. In this example, corrugated shield 64 is secured to LPT shield 80 at third mount 82C. However, it will be appreciated that, for example, mounting base 70 can readily be adapted to secure shield 64 to a corresponding surface of inner case 52, depending on the particular load and thermal constraints of a particular installation.

Shield 64 has aft mounting base 70 for supporting and suspending corrugated ring section 72 within annular hot section cavity 83, and thus forms no part of a convective sealing arrangement or flow boundary between hot and cold gas flows. Rather, convective sealing may be provided by additional or alternative seals, such as by compressive seals (not shown) disposed in gaps between and around inner case 52 and/or vane pack 56.

In this example, hot section cavity 83 is the portion of hot section H located annularly inward of vane pack 56 and not occupied by gas path G. In one example, mounting base 70 at a first axial end of shield 64 includes an aft flange and/or bosses (not numbered in FIG. 2C) cooperating with third shield mount 82C. Alternatively, mounting base 70 can be configured for securing to a flange or other connector on inner case 52. Though annular cavity 83 is part of hot section H, flow in core flow gas path G is isolated from cavity 83, save for a small degree of seal and joint leakage around vane pack 56. Since thermal radiation from a body (such as inner wall 57A) increases to the fourth power relative to its temperature, it will be appreciated that as the combustion temperature increases, so too does the thermal radiation being emitted from inner wall 57A. For example, a 10% increase in temperature of a body (e.g., inner wall 57A) can result in almost a 50% increase in thermal energy radiating from the body toward spaced apart inner case 52.

In larger engines, there is more clearance for separating hot and cold gas paths. Separate sheet metal ducts have in some instances been used to simultaneously seal the core flow gas path and to reflect blackbody radiation from internally disposed vanes back into the core flow gas flow path. However, these previous sheet metal ducts serving as the only core flow gas flow boundary are suitable for use only at relatively low combustion temperatures. To increase combustion gas temperatures in these thinner ducts, the hot gas flow boundary has been impingement cooled via cooling holes formed in the boundary of the adjacent inner or outer cold section (e.g., inner case 52 and/or outer case 48). However, this increases overall cooling air requirements, offsetting a large portion of the potential efficiency gains from higher operating temperatures.

In contrast, a separate radiation shield (e.g. shield 64) allows the use of a thicker, more robust and more thermally resistant vane pack 56, which can also therefore be placed in closer proximity to inner case 52. With its inner boundary more closely spaced from inner cold section $C_{in}$, core flow gas path G can operate at higher temperatures while reducing thermally induced fatigue of inner case 52. Further, inner case 52 need not utilize cooling holes to impingement cool the core flow gas duct, which reduces overall cooling requirements.

Some small to mid-size engines may be able accommodate a shield structure having a generally cylindrical or frustoconical ring portion disposed between the gas path flow boundary and an adjacent case. One example of such a shield is described in a commonly assigned U.S. patent application entitled, "Mid-Turbine Frame Thermal Radiation Shield", filed on an even date herewith. But in smaller engines, as one or more dimensions d, $r_1$, and $r_2$ are reduced, inner wall 57A becomes closer to, and more in the line of sight of, inner case 52, which increases its exposure to thermal radiation, and resultant radiant heating of cold section $C_{in}$. This can occur, for example, as the vane pack, or other similar gas path boundary wall is formed with more complex geometries in order to accommodate the smaller clearance envelope. This can also occur when the gas path boundary wall extends significantly forward of inner case 52 and/or when the boundary wall includes one or more forward extensions, which places a forward end of inner case 52 in the line of sight of inner vane pack wall 57A. Corrugated shield 64 can be suspended or otherwise secured so that ring section 72 is spaced generally apart from vane pack inner wall 57A and inner case 52, and outside core flow gas path G. Shield 64, with suspended ring section 72, can generally mimic the contours of vane pack 56 to improve thermal blocking, particularly for smaller engines with tight clearances between inner wall 57A and inner case 52. For example, a portion of ring section 72 opposite mounting base 70 can extend into forward vane rail pocket 79 during thermal expansion and contraction. Ring section 72 can be corrugated to better conform to an irregularly shaped inner vane pack wall 57A, allowing the overall MTF footprint to be more compact. This contributes to practical adaptation of compact engine designs with higher combustion temperatures despite smaller axial dimension d and/or radial dimensions $r_1$, $r_2$. Further reduction in engine size can therefore be adopted without the conventional sacrifices of performance and efficiency.

FIG. 3A isometrically depicts one example embodiment of corrugated shield 64, and includes shield reflective surface 65, spoke bore 66, shield mounting base 70, shield ring section 72, shield apertures 76, shield flange 84, shield bosses 86, corrugations 88, fingers 90, and forward tabs 92.

Shield 64 can include a monolithic sheet metal ring section 72, machined or otherwise processed to generally conform to the shapes of vane pack inner wall 57A and/or inner case 52. In certain embodiments, shield 64 is formed from a metallic sheet, which can be of a similar or identical grade metal as is used for outer case 48. This metal sheet may be a high temperature nickel alloy, including but not limited to those meeting the requirements of AMS 5599, many of which are available from numerous commercial suppliers. Shield 64, including at least surface 65, can be further processed if desired, such as by surface cleaning, polishing, etc., to further enhance its reflective properties.

Though shield 64 can be sized and configured to be suspended and spaced apart from both inner case 52 and vane pack 56, differing rates of thermal expansion during hot soaking may result in occasional contact with inner case 52. For example, there may be incidental contact with bosses forming inner coolant ports 53A (shown in FIGS. 2A and 2B). Occasional contact with inner case 52 is acceptable, but generally, shield 64 should be configured to avoid contact with vane pack 56, which frequently operates at temperatures sufficient to damage or deform shield 64. Contact with vane pack 56 can induce unwanted stresses in shield 64, which also lead to premature failure, as well as unwanted thermal conduction and subsequent radiation to inner case 52.

Mounting base 70, which may include a thicker flange portion 84 and bosses 86, can extend radially around the aft end of ring section 72. Flange 84 may be angled relative to ring section 72 for mounting shield 64, for example to inner case 52, and/or LPT shield 80. Shield bosses 86 can optionally be provided to secure flange 84 to one of these structures. Shield ring section 72 can also include at least one aperture 76 to accommodate elements of inner case 52 and/or vane pack 56. In some examples, there may be more or larger apertures 76 than are required for individual elements. For instance, in example MTF 46 shown in FIGS. 2A and 2B, there are a total of fourteen circumferentially distributed vanes 58, seven of which include a spoke 63 disposed through alternating vane passages 60. The correspondingly distributed fourteen apertures 76 can in certain embodiments be formed with substantially uniform cross-sections to accommodate the larger vanes 58 and passages 60 and reduce manufacturing costs. It will be appreciated that apertures 76 may each be sized to accommodate individually located elements. They may also be equally distributed circumferentially around ring section 72, or may alternatively include mistake-proofing features to encourage correct assembly. Other arrangements may be used to accommodate different MTF configurations.

It will be appreciated that in certain alternative embodiments, shield 64 may additionally include an aft ring section extending aftward from base 70, which would result in base 70 being disposed proximate an axially midpoint of shield 64. In such alternative embodiments, base 70 can secure shield 64 to inner case 52 with both forward and aft ends of shield 64 free to expand and contract as described herein.

Figure 3C:
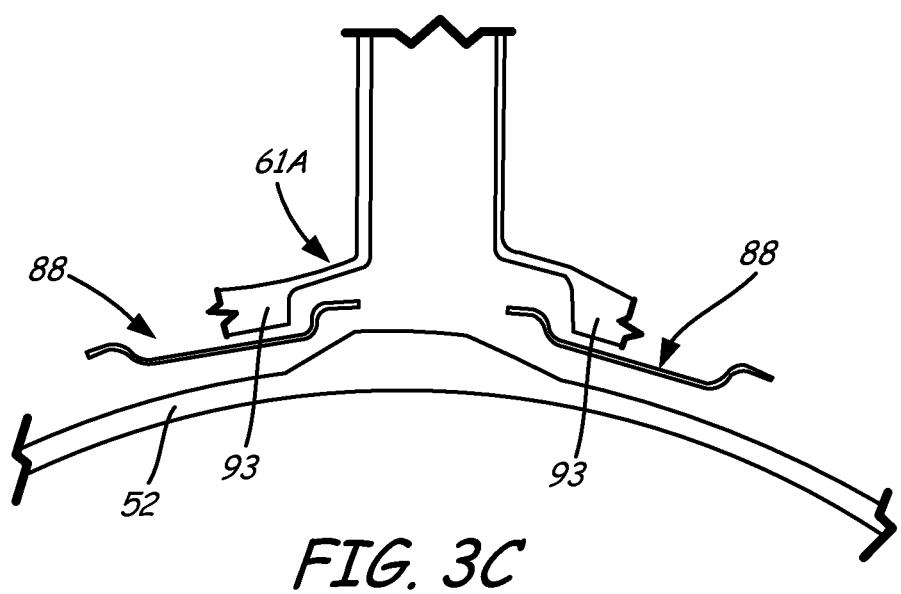
FIG. 3C is a forward facing cross-sectional view taken across line 3C-3C of FIG. 3B.

Ring section 72 also includes a plurality of radially recessed corrugations 88 distributed circumferentially therearound between adjacent ones of a plurality of fingers 90. Corrugations 88 may be formed between adjacent fingers 90 so as to accommodate a noncircular inner wall 57A. At least a portion of corrugated ring section 72 can have a noncircular cross-section to generally mimic a corresponding noncircular portion of inner vane pack wall 57A, such as is seen in FIGS. 3B-3C. Fingers 90 can also optionally include forward extending tabs 92 as shown in more detail in FIGS. 4A-4B.

FIG. 3B depicts an isometric view of corrugated shield 64 disposed between vane pack 56 and inner case 52. FIG. 3B also includes vane 58, vane passage 60, inner and outer vane pack wall portions 61A, 61B, forward vane extension 75, shield apertures 76, aft vane flange 81, shield flange 84, aft bosses 86, corrugations 88, fingers 90, forward tabs 92 and inward extending vane rails 93. FIG. 3C is a cross-section taken across line 3C-3C.

A portion of vane pack 56 is broken away to illustrate the relationship of inner wall 57A to ring section 72. Inner and outer vane pack wall portions 61A, 61B are broken away portions of respective inner and outer vane pack walls 57A, 57B (shown in FIGS. 2A and 2B). As noted above, one or both inner and outer vane pack walls 57A, 57B may be segmented and such a segment may take the place of the respective broken wall portions 61A, 61B.

Ring section 72 includes corrugations 88, into which inner vane pack wall portions 61A may extend. For example, inner vane pack wall portions 61A can include an inwardly extending rail 93 or other structure extending below the remainder of inner vane pack wall 57A. Corrugations 88, along with fingers 90 defining reflective shield surface 65, can thus conform to this irregular circumferential profile of inner wall 57A, including the profile of inner wall portions 61A. Closer conformance of corrugated shield 64 to inner wall portion 61A helps block the line of sight between inner vane pack wall 57A and inner case 52 to prevent more emitted thermal radiation from heating inner case 52. Fingers 90 with forward extending tabs 92 are also disposed in the line of sight and reflect away thermal radiation emitted from a forward end of vane pack 56, such as forward vane extension 75. Corrugations 88 and fingers 90, or other similar conforming elements on shield ring section 72 improve line of sight blocking and can thus allow for a larger axial and radial vane profile at a given set of operating temperatures while still maintaining suitably reduced temperatures at inner case 52.

Figure 4A:
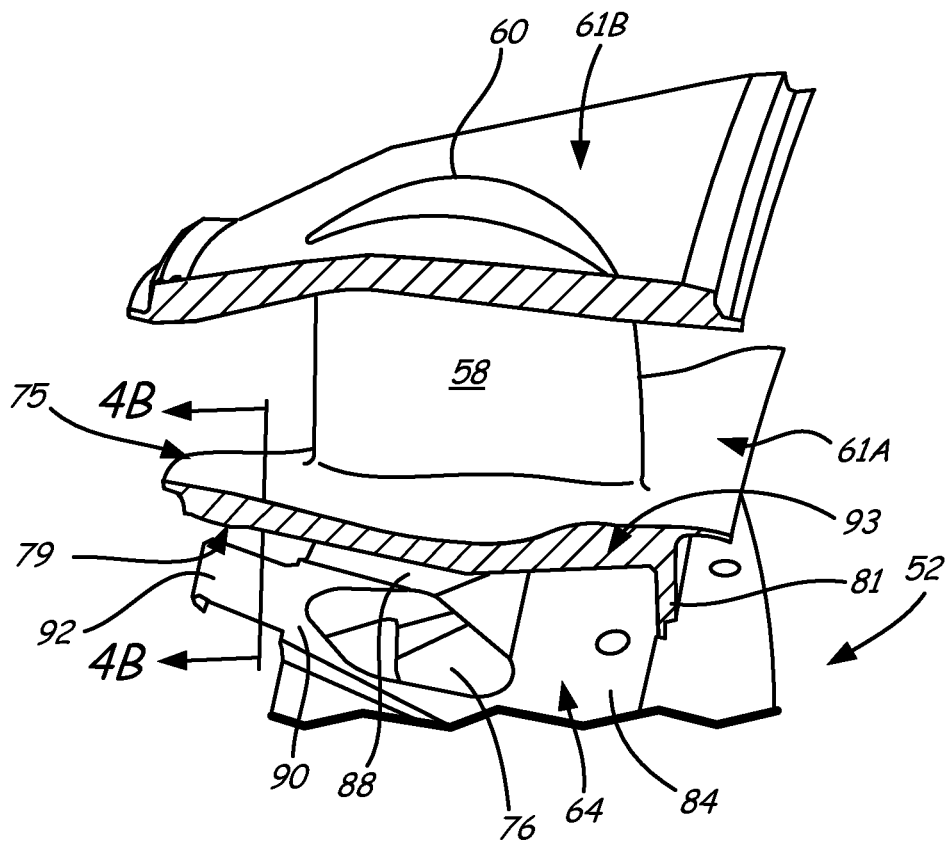
FIG. 4A includes a circumferentially facing elevation view of the vane pack portion, thermal radiation shield, and case arrangement of FIG. 3B.
Figure 4B:
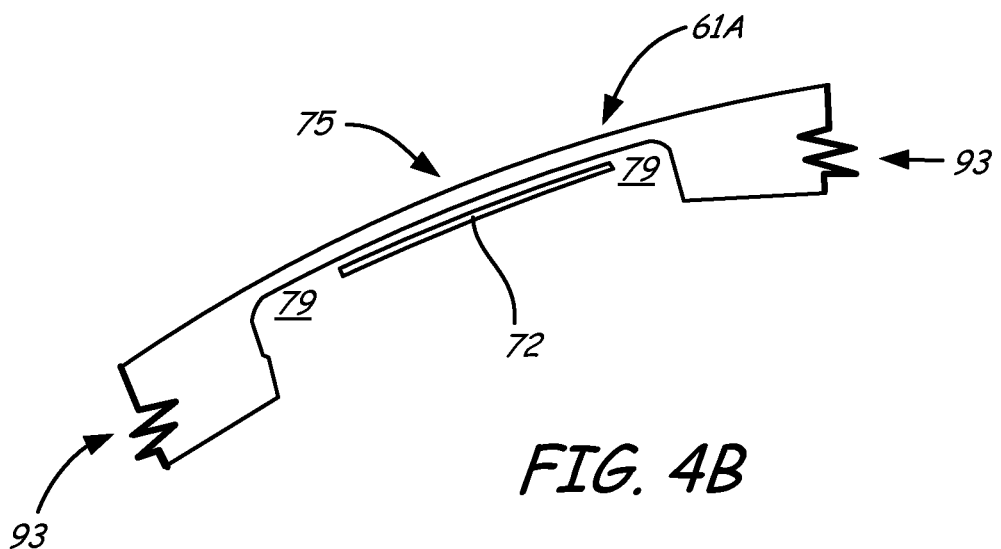
FIG. 4B a forward facing cross-sectional view taken across line 4B-4B of FIG. 4A.

FIG. 4A is a circumferentially facing isometric view of corrugated shield 64 disposed between inner vane pack wall portion 61A and inner case 52. FIG. 4A also includes vane 58, vane passage 60, outer vane wall portion 61B, shield 64, forward vane extension 75, shield aperture 76, forward vane platform pocket 79, aft vane flange 81, shield flange 84, aft bosses 86, corrugations 88, fingers 90, forward shield extension tabs 92, and rails 93. FIG. 4B is an axially forward facing cross-section taken across line 4B-4B.

Forward shield tabs 92 extending into forward vane pocket 79. As seen in FIG. 2C, pocket 79 may be formed, for example by machining, into a radially inner surface of forward vane extension 75. Tabs 92, extending forward from fingers 90 can freely expand and contract thermally into and out of pocket 79. Without forward extension tabs 92, ring section 72 would only extend roughly to the forward end of vane 58, leaving inner case exposed in the line of sight to a large forward portion of inner vane pack wall 57A, such as forward vane extension 75. Thus, this arrangement permits vane pack 56 to extend beyond the forward end of inner case 52, enabling a smaller overall axial dimension d (shown in FIG. 2A). This in combination with corrugations 88 conforming to rails 93, allows for a shorter engine footprint, with power and efficiency comparable to some larger engines.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A thermal radiation shield comprises a mounting base and a corrugated ring section. The mounting base is disposed at an aft end of the ring section for securing the shield ring section within a generally annular cavity. The generally annular cavity is defined at least in part by a hot fluid flow path boundary wall, and a radially adjacent and spaced apart cold fluid flow path boundary wall. The corrugated ring section is configured to substantially block a line of sight between the hot fluid flow path boundary wall and the cold fluid flow path boundary wall.

The shield of the preceding paragraph can optionally include, additionally and/or alternatively, any one or more of the following features, configurations and/or additional components:

A thermal radiation shield according to an exemplary embodiment of this disclosure includes, among other possible things, a mounting base and a corrugated ring section. The mounting base is disposed at an aft end of the corrugated ring section for securing the shield ring section within a generally annular cavity. The generally annular cavity is defined at least in part by a hot fluid flow path boundary wall, and a radially adjacent and spaced apart cold fluid flow path boundary wall. The corrugated ring section is configured to substantially block a line of sight between the hot fluid flow path boundary wall and the cold fluid flow path boundary wall.

A further embodiment of the foregoing shield, wherein the hot fluid flow path boundary wall additionally and/or alternatively comprises a radially inner wall of a vane pack defining an axial core flow gas path through a mid-turbine frame.

A further embodiment of any of the foregoing shields, wherein at least an axial portion of the inner vane pack wall additionally and/or alternatively includes a noncircular cross-section.

A further embodiment of any of the foregoing shields, wherein the cold fluid flow path boundary wall additionally and/or alternatively comprises an inner case of the mid-turbine frame.

A further embodiment of any of the foregoing shields, wherein the corrugated ring section additionally and/or alternatively comprises a plurality of radially recessed corrugations distributed circumferentially around the ring section between adjacent ones of a plurality of circumferentially distributed fingers.

A further embodiment of any of the foregoing shields, wherein additionally and/or alternatively, the plurality of radially recessed corrugations generally conform to a corresponding plurality of circumferentially disposed rails extending inwardly from the inner vane pack wall.

A further embodiment of any of the foregoing shields, wherein at least one of the fingers of the corrugated ring section additionally and/or alternatively includes a tab extending beyond a forward end of adjacent ones of the plurality of corrugations.

A further embodiment of any of the foregoing shields, wherein the tab is additionally and/or alternatively disposed in a line of sight path between a forward extending surface of the inner vane pack wall, and a forward portion of the inner case.

A further embodiment of any of the foregoing shields, wherein the tab is additionally and/or alternatively sized to thermally expand and contract into a pocket disposed on the forward extending surface of the inner vane pack wall.

A further embodiment of any of the foregoing shields, wherein the ring section additionally and/or alternatively includes a plurality of apertures formed therethrough, each of the plurality of apertures having a substantially uniform cross-section and circumferential distribution.

A further embodiment of any of the foregoing shields, wherein the mounting base additionally and/or alternatively supports the corrugated ring section, and suspends a forward end the corrugated ring section in the annular hot section cavity spaced apart from the hot fluid flow path boundary wall and the cold fluid flow path boundary wall.

A gas turbine engine mid-turbine frame comprises a radially outer case, a radially inner case, a plurality of load spokes, a vane pack, and a corrugated shield. The radially outer case bounds an outer cold section outward of the outer case. The radially inner case bounds an inner cold section inward of the inner case. The radially outer and inner cases define an annular hot section therebetween. The plurality of load spokes extend radially through the hot section and secure the outer case with the inner case. The vane pack defines a sealed core flow gas path axially traversing an annular portion of the hot section. The corrugated thermal radiation shield is suspended within a generally annular hot section cavity defined outside the sealed core flow gas path.

The mid-turbine frame of the preceding paragraph can optionally include, additionally and/or alternatively, any one or more of the following features, configurations and/or additional components:

A gas turbine engine mid-turbine frame according to an exemplary embodiment of this disclosure includes, among other possible things, comprises a radially outer case, a radially inner case, a plurality of load spokes, a vane pack, and a corrugated shield. The radially outer case bounds an outer cold section outward of the outer case. The radially inner case bounds an inner cold section inward of the inner case. The radially outer and inner cases define an annular hot section therebetween. The plurality of load spokes extend radially through the hot section and secure the outer case with the inner case. The vane pack defines a sealed core flow gas path axially traversing an annular portion of the hot section. The corrugated thermal radiation shield is suspended within a generally annular hot section cavity defined outside the sealed core flow gas path. The corrugated thermal radiation shield includes a corrugated ring section.

A further embodiment of foregoing mid-turbine frame, wherein the corrugated ring section is additionally and/or alternatively suspended in the generally annular hot section cavity from a mounting base to substantially block a line of sight between an inner vane pack wall and the inner case.

A further embodiment of any of the foregoing mid-turbine frames, wherein the inner vane pack wall additionally and/or alternatively includes a noncircular cross-section.

A further embodiment of any of the foregoing mid-turbine frames, wherein the corrugated ring section additionally and/or alternatively comprises a plurality of radially recessed corrugations distributed circumferentially around the ring section between adjacent ones of a plurality of circumferentially distributed fingers.

A further embodiment of any of the foregoing mid-turbine frames, wherein additionally and/or alternatively, the plurality of radially recessed corrugations generally conform to a corresponding plurality of circumferentially disposed rails extending inwardly from the inner vane pack wall.

A further embodiment of any of the foregoing mid-turbine frames, wherein each of the plurality of fingers additionally and/or alternatively includes a corresponding plurality of tabs extending beyond respective forward ends of the adjacent ones of the corrugations.

A further embodiment of any of the foregoing mid-turbine frames, wherein at least one of the plurality of tabs are additionally and/or alternatively disposed in a line of sight path between a forward extending surface of the inner vane pack wall, and a forward portion of the inner case.

A further embodiment of any of the foregoing mid-turbine frames, wherein the at least one tab additionally and/or alternatively thermally expands and contracts into a pocket disposed on the forward extending surface of the inner vane pack wall.

A further embodiment of any of the foregoing mid-turbine frames, wherein the corrugated ring section includes a plurality of apertures formed therethrough, each of the plurality of apertures having a substantially uniform cross-section and equal circumferential distribution.

The invention claimed is:
1. A thermal radiation shield comprising:
a mounting base configured for securing to an aft mounting surface; and
a corrugated ring section extending axially from the mounting base, the corrugated ring section shaped such that, when the mounting base is secured to the aft mounting surface, the corrugated ring section extends axially forward into a generally annular cavity defined at least in part by a hot fluid flow path boundary wall and a radially adjacent and spaced apart cold fluid flow path boundary wall, the corrugated ring section is suspended via the mounting base and spaced from at least the hot fluid flow path boundary wall;
wherein the corrugated ring section is shaped to substantially block a line of sight from all of the hot fluid flow path boundary wall to the cold fluid flow path boundary wall.

2. The shield of claim 1, wherein the hot fluid flow path boundary wall comprises a radially inner wall of a vane pack defining an axial core flow path through a mid-turbine frame.

3. The shield of claim 1, wherein at least an axial portion of the hot fluid flow path boundary wall includes a noncircular cross-section.

4. The shield of claim 1, wherein the cold fluid flow path boundary wall comprises an inner case of a mid-turbine frame.

5. The shield of claim 1, wherein the corrugated ring section comprises a plurality of radially recessed corrugations distributed circumferentially around the ring section between adjacent ones of a plurality of circumferentially distributed fingers.

6. The shield of claim 1, wherein the plurality of radially recessed corrugations generally conform to a corresponding plurality of circumferentially disposed rails extending inwardly from the inner vane pack wall.

7. The shield of claim 6, wherein at least one of the fingers includes a tab extending beyond a forward end of adjacent ones of the plurality of corrugations.

8. The shield of claim 7, wherein the tab is disposed in a line of sight path between a forward extending surface of the inner vane pack wall, and a forward portion of the inner case.

9. The shield of claim 7, wherein the tab is sized to thermally expand and contract into a pocket disposed on the forward extending surface of the inner vane pack wall.

10. The shield of claim 1, wherein the ring section includes a plurality of apertures formed therethrough, each of the plurality of apertures having a substantially uniform cross-section and circumferential distribution.

11. The shield of claim 1, wherein the mounting base supports the corrugated ring section, and suspends a forward end the corrugated ring section in the annular hot section cavity spaced apart from the hot fluid flow path boundary wall and the cold fluid flow path boundary wall.

12. A mid-turbine frame for a gas turbine engine, the mid-turbine frame comprising:
a radially outer case including an outer case wall bounding an outer cold section outward of the outer case;
a radially inner case including an inner case wall bounding an inner cold section inward of the inner case, the radially outer and inner cases defining an annular hot section therebetween;
a plurality of load spokes extending radially through the hot section and securing the outer case with the inner case;
a vane pack including an outer vane pack wall and an inner vane pack wall defining a sealed core flow gas path axially traversing an annular portion of the hot section;
a generally annular hot section cavity disposed outside the sealed core flow gas path; and
a corrugated thermal radiation shield suspended within the hot section cavity, the corrugated thermal radiation shield comprising:
a mounting base configured for securing to an aft mounting surface; and
a corrugated ring section extending axially forward from the mounting base into the hot section cavity;
wherein the corrugated ring section is suspended via the mounting base and is shaped to substantially block a line of sight between all of the vane pack and a one of the outer case wall and the inner case wall disposed radially adjacent to the corrugated ring section.

13. The mid-turbine frame of claim 12, wherein the corrugated ring section is suspended in the hot section cavity to substantially block a line of sight between the inner vane pack wall and the inner case wall.

14. The mid-turbine frame of claim 12, wherein at least one of the outer vane pack wall and the inner vane pack wall includes a noncircular cross-section.

15. The mid-turbine frame of claim 12, wherein the corrugated ring section comprises a plurality of radially recessed corrugations distributed circumferentially around the corrugated ring section between adjacent ones of a plurality of circumferentially distributed fingers.

16. The mid-turbine frame of claim 15, wherein the plurality of radially recessed corrugations generally conform to a corresponding plurality of circumferentially disposed rails extending inwardly from the inner vane pack wall.

17. The mid-turbine frame of claim 15, wherein the plurality of fingers includes a corresponding plurality of tabs extending beyond forward ends of the adjacent ones of the corrugations.

18. The mid-turbine frame of claim 17, wherein at least one of the plurality of tabs is disposed in a line of sight path between a forward extending surface of the inner vane pack wall, and a forward portion of the inner case.

19. The mid-turbine frame of claim 17, wherein the at least one tab thermally expands and contracts into a corresponding pocket disposed on the forward extending surface of the inner vane pack wall.

20. The mid-turbine frame of claim 12, wherein the corrugated ring section includes a plurality of apertures formed therethrough, each of the plurality of apertures having a substantially uniform cross-section and equal circumferential distribution.

* * * * *